United States Patent

Blasingame et al.

(12) United States Patent
(10) Patent No.: US 6,891,181 B2
(45) Date of Patent: May 10, 2005

(54) OPTO-ELECTRONIC TRANSMISSIVE EDGE LOCATION SENSOR

(75) Inventors: Raymond W. Blasingame, Richardson, TX (US); Ronald W. Chandler, Plano, TX (US); Norman B. Stapleton, Princeton, TX (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/338,599

(22) Filed: Jan. 8, 2003

(65) Prior Publication Data

US 2004/0129902 A1 Jul. 8, 2004

(51) Int. Cl.[7] ............................ G01N 21/86; G01V 8/00
(52) U.S. Cl. .......................... 250/559.12; 250/559.36; 356/614
(58) Field of Search .................... 250/559.12, 559.36; 356/614, 621; 340/675–676

(56) References Cited

U.S. PATENT DOCUMENTS

| | | | |
|---|---|---|---|
| 4,708,759 A | 11/1987 | Porat | 156/360 |
| 5,006,719 A | 4/1991 | Blaser | 250/560 |
| 5,107,127 A * | 4/1992 | Stevens | 250/548 |
| 5,187,375 A | 2/1993 | Masten | 250/561 |
| 5,351,309 A * | 9/1994 | Lee et al. | 382/199 |
| 5,522,147 A | 6/1996 | Tully et al. | 33/567 |
| 5,572,039 A | 11/1996 | Sweeney et al. | 250/559.3 |
| 5,739,913 A | 4/1998 | Wallace | 356/401 |
| 5,760,414 A * | 6/1998 | Taylor | 250/559.42 |
| 5,977,533 A | 11/1999 | Clayton | 250/205 |
| 6,194,698 B1 | 2/2001 | Zavislan et al. | 250/214 A |
| 6,385,430 B1 * | 5/2002 | Jackson et al. | 399/371 |
| 6,396,073 B1 * | 5/2002 | Taylor | 250/559.42 |

FOREIGN PATENT DOCUMENTS

EP     0 316 624 A2     5/1988     .......... G01B/11/02

* cited by examiner

*Primary Examiner*—Stephone B. Allen
*Assistant Examiner*—Patrick J. Lee
(74) *Attorney, Agent, or Firm*—Kris T. Fredrick; Kermit D. Lopez; Luis Ortiz

(57) ABSTRACT

Optical sensor methods and systems for detecting the edge of an object are disclosed. An optical sensor having dual equal area active regions can be provided, and a uniform light source located opposite the optical sensor, such that an occlusion of light from the uniform light source provides location determination data of an object via the optical sensor regardless of the direction of motion of the occlusion relative to the dual equal area active regions thereof.

20 Claims, 5 Drawing Sheets

OPTO-ELECTRONIC TRANSMISSIVE EDGE LOCATION SENSOR

TECHNICAL FIELD

The present invention generally relates to semiconductor sensors, including optical sensors. The present invention also relates to sensors for detecting the edge of an object for position location thereof. The present invention is also related to silicon photo detector devices and manufacturing technologies thereof.

BACKGROUND OF THE INVENTION

Optical sensors are well known in the electronic sensing arts. Optical sensors are commonly used in the field of printers and hand-held and desktop computers. Functions of sensors within this field usually include label detection, gap detection, skew, label length or width determination, etc. Advantages of these devices include their small size and durability. As with any device, however, there are also disadvantages, including the fact that a certain level of sensitivity, precision or tolerance associated with each sensor, can vary greatly. Additionally, ambient lighting can greatly confuse the interpretation of the light received by the sensor, and the characteristics of the print media or other sensing media or sensing target can vary greatly. A higher sensitivity or tighter tolerance can result in a higher sensor cost, which presents another disadvantage.

In order to maintain reasonable costs associated with devices, such as, for example, printers, while attaining considerable accuracy, conventional sensing devices have employed a variety of sensing methods, which utilize lower-cost sensors to achieve acceptable results. Such sensors, however, generally become dirty, decay over time, rely upon inconsistent and varying manufacturing techniques, and in many other manners the characteristics of each sensor are different or can change over time. Thus, conventional sensor designs, which did not precisely account for these variations or changing ambient conditions, could not provide consistently reliable results. Other prior art designs offer manual adjustability or self-calibration but with heightened design and manufacturing complexity and greatly increased costs.

Optical sensors are ideally suited for edge detection. As explained, above, however, conventional optical sensors have a number of limitations, including the inability to provide highly accurate and repeatable sensing data regardless of the direction of motion of a sensor or optical light occlusion thereof.

The present inventors have thus concluded, based on the foregoing, that a need exists for an improved optical sensor, including methods and systems thereof, for use in detecting the edge of target objects. The present inventors believed that the improved optical sensing methods and systems disclosed herein can provide an accurate and repeatable edge detection of an object without suffering from the inconsistencies and inefficiencies that currently plague conventional optical sensing devices.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for improved optical sensor methods and systems.

It is also an aspect of the present invention to provide a semiconductor optical sensor having dual area active regions thereof.

It is another aspect of the present invention to provide an improved optical sensor for the detection of an edge of an object to determine its precise position and to allow servoing to a pre-determined location.

The above and other aspects can be achieved as is now described. Optical sensor methods and systems for detecting an edge of an object are disclosed herein. An optical sensor having dual equal area active regions is provided. A uniform light source is located opposite the optical sensor, wherein an occlusion of light from the uniform light source provides location determination data of an object via the optical sensor regardless of a direction of motion of the occlusion relative to the dual equal area active regions thereof.

The optical sensor can be configured in the shape of a rectangle and the dual equal area active regions thereof can be configured to include at least one upper region configured in a shape of an inverted triangle, and at least one lower region formed from a remainder of the rectangle, thereby resembling a shape of mirrored triangles having a common vertex and at least one hypotenuse thereof separated from the upper region by a thin inactive region.

The present invention can provide accurate and repeatable detection of the edge of an object to determine its precise position, and also allows servoing to a pre-determined location. The optical sensor described herein can be implemented as a silicon, or other semiconductor, optical sensor composed of dual equal area active regions whose geometry is configured, such that the occlusion of light from a light source, normal to the plane of the optical sensor, produces a differential output whose characteristics provide highly accurate and repeatable means of location determination regardless of the direction of motion of the occlusion.

Due to the unique geometric layouts of the active areas, as the occlusion moves across the sensor an unbalanced output is created that only becomes balanced at the exact center of the optical sensor. The direction and magnitude of displacement can also be resolved from the sensor outputs.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

Figure 1:
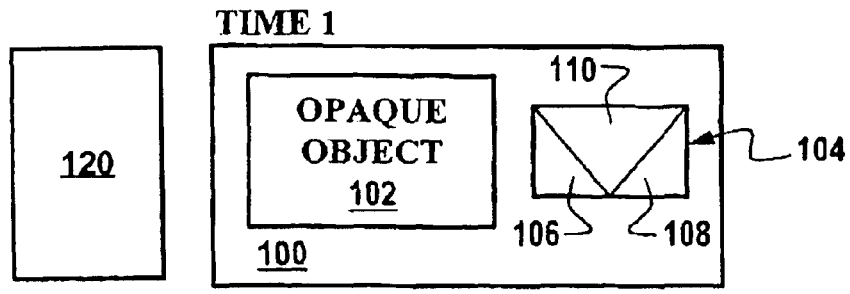
FIG. 1 depicts a block diagram of a sensor system at Time 1, in accordance with a preferred embodiment of the present invention.

FIG. 1 depicts a block diagram of a sensor system 100 at Time 1, in accordance with a preferred embodiment of the present invention. Sensor system 100 includes an optical sensor 104 that can be fabricated utilizing conventional silicon photo-detector manufacturing processes and methodologies to produce a unique geometric layout of active regions. When nested, the two active regions can form a rectangle.

In accordance with a preferred embodiment of the present invention, an upper region 110 can be shaped as an inverted equilateral triangle and lower regions 106 and 108 can be formed by the remainder of the rectangle, thereby resembling mirrored right triangles with a common vertex and hypotenuses thereof, which can be separated from the upper region 110 by a very thin inactive region. This thin inactive region, although existing physically, can possess a negligible width thereof that is effectively zero when sensor diodes associated with sensor 104 are reverse biased. Note that the term "opto-electronic sensor" and "optical sensor" can be utilized interchangeably herein to describe the same general device.

In practical usage, sensor 104 can be mounted opposite a uniform light source 120, and thereafter powered up so that the outputs of sensor 104 are monitored for change in current. Thus, as indicated in the example of FIG. 1, sensor 104 can be located proximate to an opaque object 102. At Time 1, as shown in FIG. 1, sensor 104 is generally unobscured, such that the output of both channels are virtually equivalent to one another and dependent upon the intensity of the light source.

Figure 2:
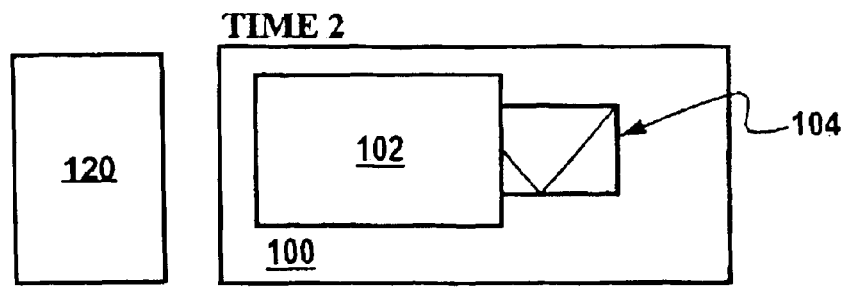
FIG. 2 illustrates a block diagram of a sensor system at Time 2, in accordance with a preferred embodiment of the present invention.
Figure 3:
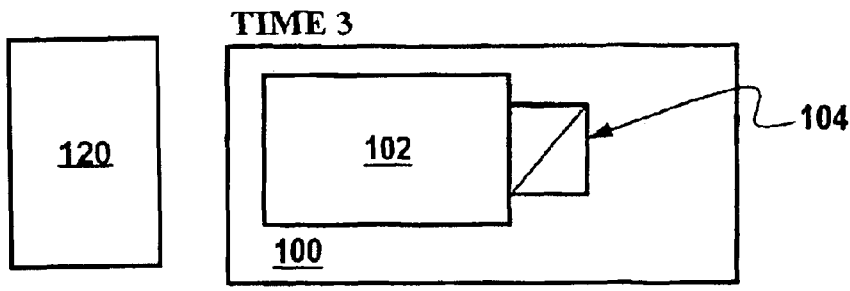
FIG. 3 depicts a block diagram of a sensor system at Time 3, in accordance with a preferred embodiment of the present invention.
Figure 4:
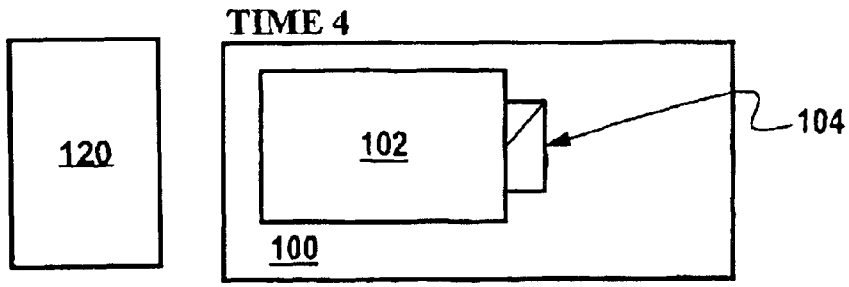
FIG. 4 illustrates a block diagram of a sensor system at Time 4, in accordance with a preferred embodiment of the present invention.

FIG. 2 illustrates a block diagram of the sensor system 100 at Time 2, in accordance with a preferred embodiment of the present invention. Similarly, FIG. 3 depicts a block diagram of the sensor system 100 at Time 3, in accordance with a preferred embodiment of the present invention. Likewise, FIG. 4 illustrates a block diagram of the sensor system 100 at Time 4, in accordance with a preferred embodiment of the present invention. Thus, in FIGS. 1 to 4, like or analogous parts are indicated by identical reference numerals.

As depicted in FIG. 2, as the opaque object 102 begins to occlude sensor 104, the current in the upper region 110 will always be higher than the current in lower regions 106 and 108 until the opaque object 102 is directly centered over the sensor 104, as indicated in FIG. 3, at which time the currents will be exactly the same. As the opaque object 102 continues across the sensor 104, the current in the lower regions 106 and 108 will always be higher than the current in the upper region 110 until the sensor 104 eventually becomes entirely occluded at which time both outputs are approximately zero.

Note that in FIG. 4, the sensor 104 is depicted as approaching complete occlusion. It can be appreciated by those skilled in the art, based on FIGS. 1 to 4, that a complete occlusion is eventually achieved. Depending on the current differential between the two outputs, the distance from the center of the sensor 104 can be calculated and the direction can be determined by comparing the previous outputs to the latest outputs.

Sensor 104 can therefore be implemented as a semiconductor optical sensor that includes dual equal area active regions whose geometry is configured, such that occlusion of light from a light source, normal to the plane of the sensor 104, produces a differential output whose characteristics provide highly accurate and repeatable means of location determination regardless of the direction of motion of the occlusion. Due to the unique geometric layouts of the active areas, as the occlusion moves across the sensor 104, an unbalanced output can be created that only becomes balanced at the exact center of the sensor 104. The direction and magnitude of displacement can also be resolved from the sensor outputs.

It can be appreciated by those skilled in the art that the configuration depicted in FIGS. 1 to 4 herein represents one possible embodiment of the present invention and that other variations may be implemented, such as a different geometric layout of the active areas. At can also be appreciated by those skilled in the art that the output whose characteristics are utilized for location determination is not limited to current data, but can also be voltage and/or resistance or a combination thereof.

Figure 5:
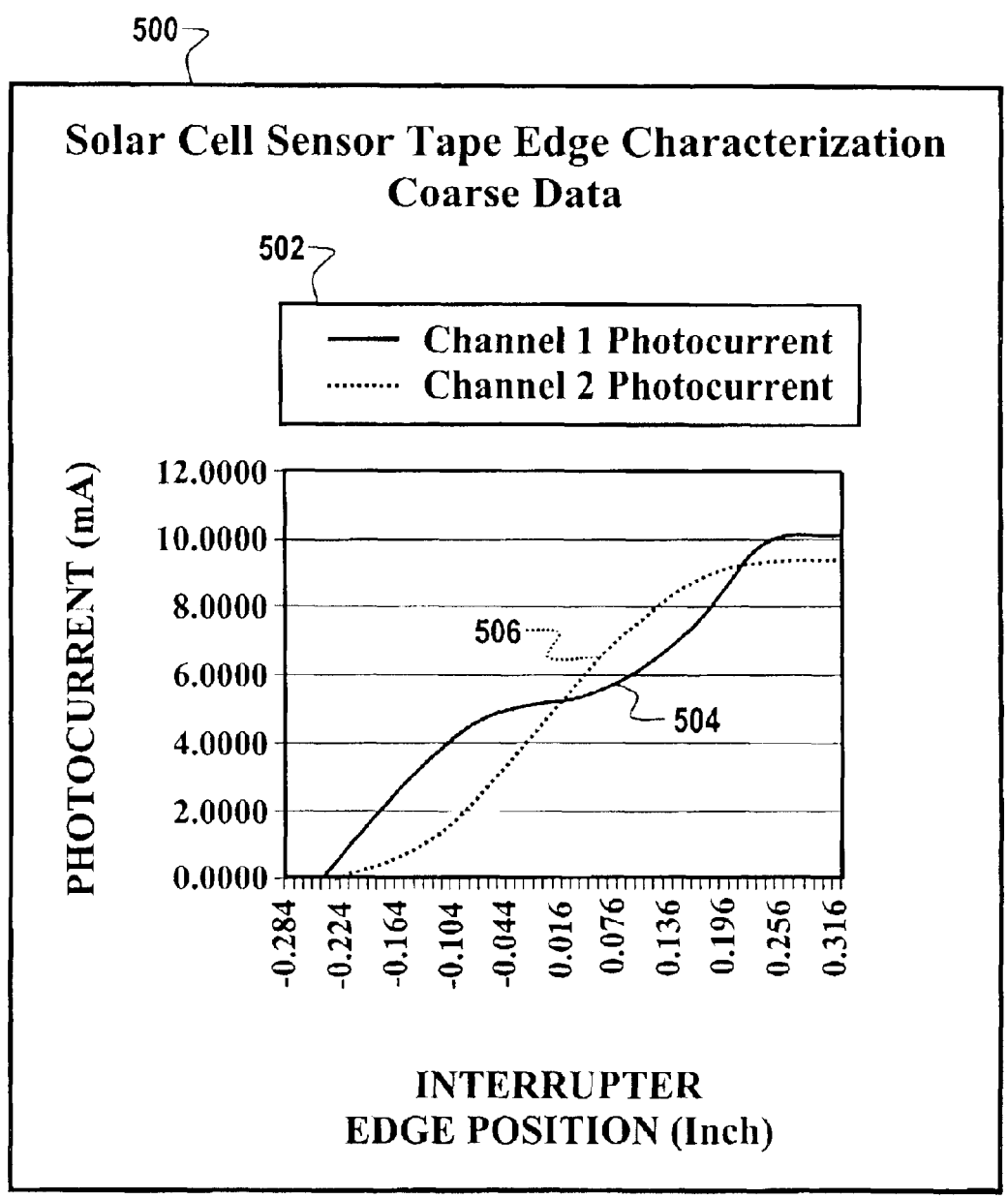
FIG. 5 depicts a graph depicting solar cell sensor tape edge characterization coarse data, which can be generated in accordance with a preferred embodiment of the present invention.

FIG. 5 depicts a graph 500 depicting solar cell sensor tape edge characterization coarse data, which can be generated in accordance with a preferred embodiment of the present invention. Graph 500 includes a legend box 502 referencing channel 1 and channel 2 photocurrent plot lines, which are respectively shown in graph 500 as plot lines 504 and 506. Plot lines 506, with respect to a channel 2 photocurrent extends from an interrupter edge position of −0.284 inches to 0.316 inches. Plot line 504, on the other hand extends from an interrupter edge position located approximately between −0.284 inches and −0.225 inches to 0.316 inches, as shown in graph 500 of FIG. 5.

Plot line 504 flattens out at a photocurrent of approximately 10 mA, while plot line 506 flattens out between a photocurrent of 8 mA and 10 mA at approximately 9 mA. It can be appreciated by those skilled in the art that the data depicted in FIG. 5 is not considered a limiting feature of the present invention, but is presented for generally illustrative and edification purposes only.

Figure 6:
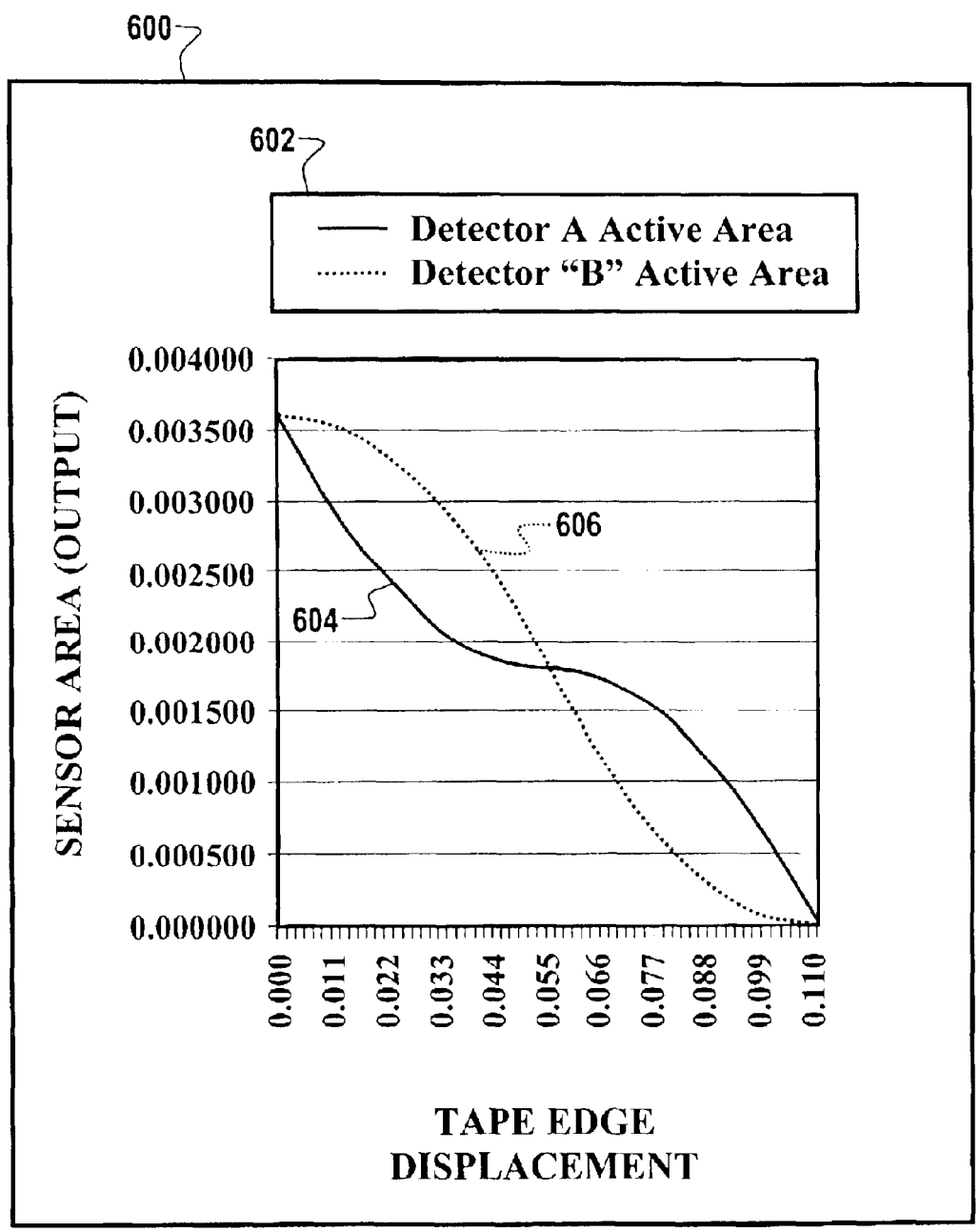
FIG. 6 illustrates a graph depicting sensor area output data versus tape edge displacement data, which can be generated in accordance with a preferred embodiment of the present invention.

FIG. 6 illustrates a graph 600 depicting sensor area output data versus tape edge displacement data, which can be generated in accordance with a preferred embodiment of the present invention. Graph 600 includes a legend box 602 referencing detector "A" active area and "B" active area output data. Line 604 is thus associated with output from the A active area, while line 606 is associated with the output from the B active area. The B active area is analogous to the upper region 110 of sensor 104, while the A active area is analogous to the lower regions 106 and 108 of sensor 104.

Figure 7:
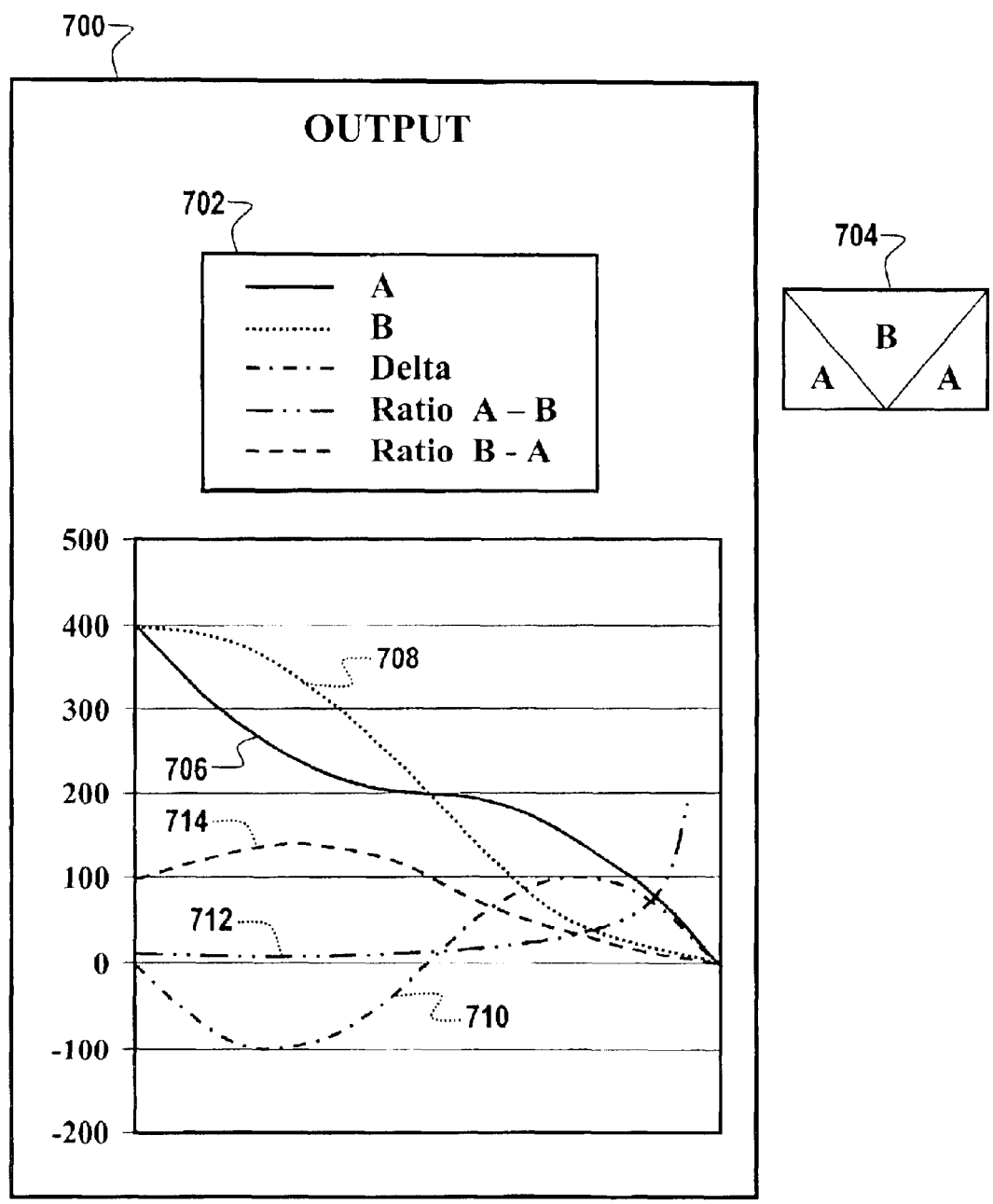
FIG. 7 depicts a graph illustrating sensor output data generated with respect to a sensor implemented in accordance with a preferred embodiment of the present invention.

FIG. 7 depicts a graph 700 illustrating sensor output data generated with respect to a sensor implemented in accordance with a preferred embodiment of the present invention. Graph 700 generally depicts sample calculated output data obtained from a sensor 704 whose area is arbitrarily set at 800 units. Sensor 704 of FIG. 7 is generally analogous to the sensor 104 depicted in FIGS. 1 to 4 herein. Sensor 704 thus includes lower region(s) A and upper region B.

A legend box 702 indicates respective output values associated with sensor 704, including lower region A and upper region B. Delta (i.e., differential) values, along with the ratios of A to B and B to A are also shown in legend box 702 and referenced by plot lines of graph 700. Thus, line 706 is associated with output data from lower region A, while line 708 is associated with output data from upper region B. Line 710 references delta values, while line 712 is associated with a ratio A to B data and line 714 with a ratio of B to A data. It can be appreciated by those skilled in the art that the data depicted in FIG. 7 is not considered a limiting feature of the present invention, but is presented generally for illustrative and edification purposes only.

The optical sensor described herein can be adapted, for example, for use to servo-control the tape edge in a tape storage application. Essentially, a "zero" position of the tape would occur when a first channel and two outputs thereof are equal. If the tape moves and unbalances the sensor output, then the direction of movement can be determined by the relative magnitudes of the first and second channels. For example, if the tape moved from a zero position to a left position, then a channel two-output signal would be lower in magnitude than a channel one output signal. Thus, the tape could then be adjusted to the right.

Figure 8:
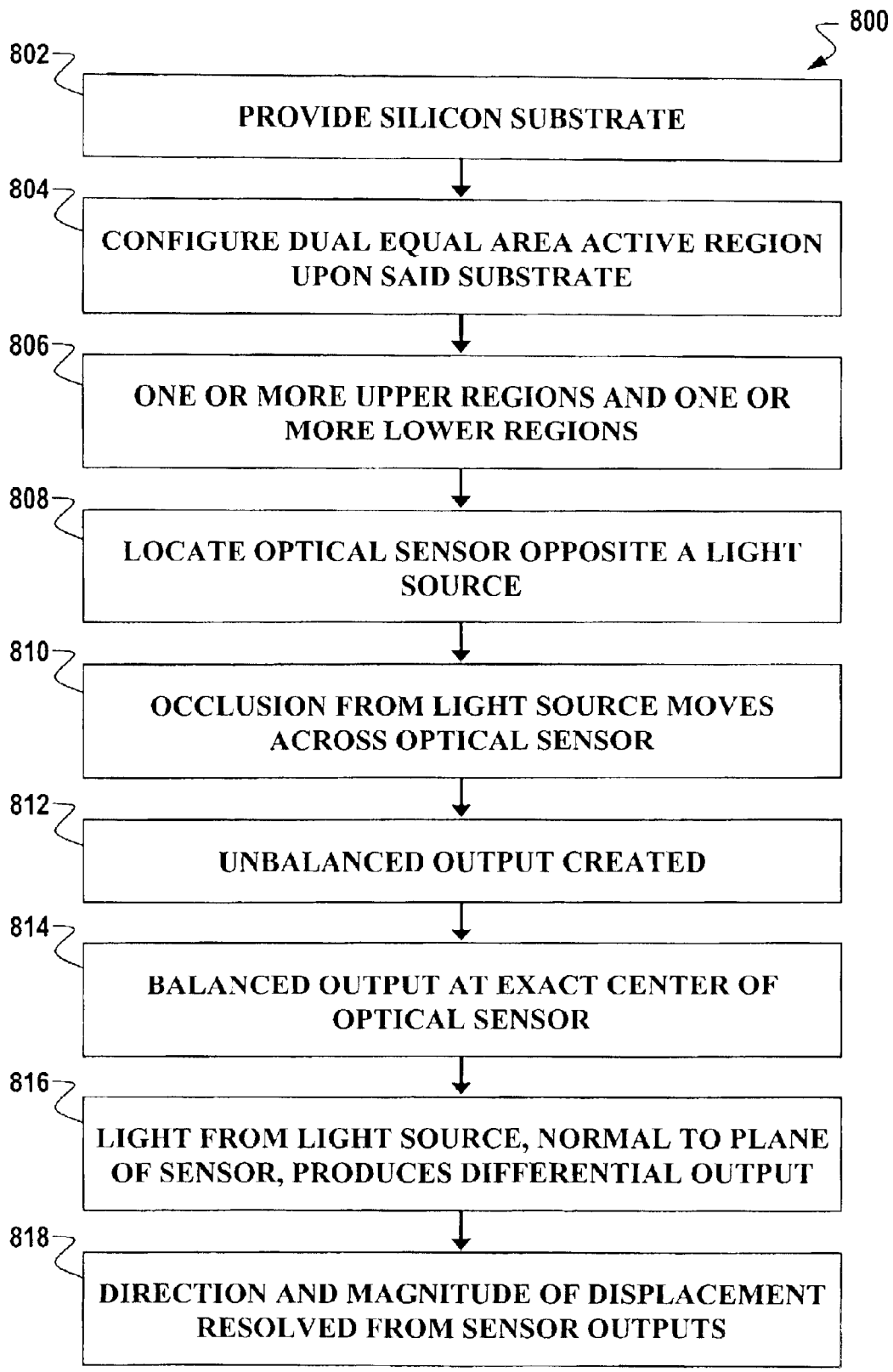
FIG. 8 illustrates a high-level flow chart depicting logical operational steps that can be followed to implement an optical sensor in accordance with a preferred embodiment of the present invention.

FIG. 8 illustrates a high-level flow chart 800 depicting logical operational steps that can be followed to implement an optical sensor in accordance with a preferred embodiment of the present invention. As indicated at block 802, the optical sensor described herein can be formed upon, but not limited to, a silicon substrate, thereby providing a silicon-based optical sensor device. As indicated next at block 804, the optical sensor can be configured to include dual equal area active regions, which include, as depicted at block 806, one or more upper regions and one or more lower regions. An example of an upper region includes upper region 110 and lower regions 106 and 108 of sensor 104 of FIGS. 1 to 4. Once the optical sensor is formed, it can be located opposite a light source, as indicated at block 808.

Thereafter, as illustrated at block 810, occlusion of light from the light source moves across the optical sensor, and next, as indicated at block 812, an unbalanced output can be created. This unbalanced output generated from the optical sensor becomes balanced at the exact center of the optical center, as illustrated at block 814. The geometry of the optical sensor, including the dual equal area active regions is such that occlusion of light from a light source, normal to the plane of the sensor, produces a differential output whose characteristics provide highly accurate and repeatable means of location determination regardless of the direction of motion of the occlusion, as indicated at block 816. The direction and magnitude of the displacement can then be resolved from the sensor outputs, as illustrated at block 818.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of an invention in which an exclusive property or right is claimed are defined as follows:

1. An optical sensor system for detecting an edge of an object, said system comprising:
    an optical sensor configured upon a silicon substrate, wherein said optical sensor comprises dual equal area active regions configured upon said silicon substrates; and
    a uniform light source located opposite said optical sensor, wherein said uniform light source generates an occlusion of light normal to a plane of said optical sensor, thereby providing location determination data of an object via said optical sensor regardless of a direction of motion of said occlusion relative to said dual equal area active regions thereof.

2. The system of claim 1 wherein said dual equal area active regions further comprise:
    an upper region in a shape of an inverted equilateral triangle; and
    a first lower region and a second lower region, wherein said upper region is located between said first and second lower regions wherein said first and second lower regions resemble mirrored right triangles with a common vertex and hypotenuses thereof, such said first and second lower regions each comprise a shape of a right triangle; and
    wherein said upper region and said first and second lower regions together form a rectangle, thereby by providing a geometry for said dual equal area active regions in which an occlusion of light normal to a plane of said optical sensor from said uniform light source produces a differential output whose characteristics provide highly accurate and repeatable means of location determination data regardless of a direction of motion of said occlusion of light, such that as said occlusion of light moves across said optical sensor, an unbalanced output is created that only becomes balanced at an exact center of the said optical sensor.

3. The system of claim 1 wherein said object comprises an opaque object.

4. The system of claim 1 wherein said optical sensor comprises a shape of a rectangle such that said dual equal area active regions thereof further comprise:
    at least one upper region thereof configured in a shape of an inverted triangle; and
    at least one lower region formed from a remainder of said rectangle, thereby resembling a shape of mirrored triangles having a common vertex and at least one hypotenuse thereof separated from said at least one upper region by a thin inactive region.

5. The system of claim 1 wherein said dual equal active regions comprise an inverted equilateral triangle.

6. The system of claim 1 wherein an output that is unbalanced is generated as said occlusion moves across said optical sensor and wherein said output becomes balanced only at a precise center of said optical sensor.

7. The system of claim 2 wherein said location determination data includes information indicative of a direction and a magnitude of displacement of said object.

8. The system of claim 1 further comprising:

a first active region of said dual equal area active regions and a second active region of said dual equal area active regions, wherein at least one of a current, a voltage, and a resistance differential output produced by said first and second active regions determines a distance from a center of said optical sensor and wherein a direction thereof can be determined by comparing said differential output to a previous differential output.

9. The system of claim 2 wherein as said object begins to occlude said optical sensor, a current in said upper region is higher than a current in said first and second lower regions until said object is directly centered over said optical sensor at which time said current in said upper region is approximately equal to said current in said first and second lower regions; and wherein as said object continues across said optical sensor, said current in said first and second lower regions is higher than said current in said upper region until said optical sensor eventually becomes entirely occluded at which time outputs thereof are approximately zero.

10. An optical sensor system for detecting an edge of an object, said system comprising:

an optical sensor having dual equal area active regions that are unaligned with a motion to be measured and are oriented at an angle to enable a production of an analog signal that is a function of position, wherein said optical sensor comprises a shape of a rectangle and wherein said dual equal area active regions thereof further comprise:

an upper region thereof configured in a shape of an inverted triangle; and two lower regions formed from a remainder of said rectangle, thereby resembling a shape of mirrored triangles having a common vertex and at least one hypotenuse thereof separated from said at least one upper region by a thin inactive region;

a uniform light source located opposite said optical sensor, wherein an occlusion of light from said uniform light source provides location determination data of an object via said optical sensor regardless of a direction of motion of said occlusion relative to said dual equal area active regions thereof, wherein a current differential output produced by said upper region and said two lower regions determines a distance from a center of said optical sensor and wherein a direction thereof can be determined by comparing said current differential output to a previous differential output;

wherein as said object begins to occlude said optical sensor, a current in said upper region is higher than a current in said two lower regions until said object is directly centered over said optical sensor at which time said current in said upper region is approximately equal to said current in said two lower regions; and wherein as said object continues across said optical sensor, said current in said two lower regions is higher than said current in said upper region until said optical sensor eventually becomes entirely occluded at which time outputs thereof are approximately zero.

11. An optical sensor method for detecting an edge of an object, said method comprising the steps of:

providing an optical sensor formed upon a silicon substrate;

configuring said optical sensor to comprise dual equal area active regions formed upon said silicon substrate; and locating a uniform light source opposite said optical sensor, wherein an occlusion of light from said uniform light source provides location determination data of an object via said optical sensor regardless of a direction of motion of said occlusion relative to said dual equal area active regions thereof.

12. The method of claim 11 further comprising the steps of:

configuring said dual equal area active regions to further comprise an upper region in a shape of an inverted equilateral triangle and a first lower region and a second lower region, wherein said first and second lower regions each comprise a shape of a right triangle; and locating said upper region between said first and second lower regions wherein said first and second lower regions resemble mirrored right triangles with a common vertex and hypotenuses thereof, and wherein said upper region and said first and second lower regions together form a rectangle, thereby by providing a geometry for said dual equal area active regions in which an occlusion of light normal to a plane of said optical sensor from said uniform light source produces a differential output whose characteristics provide highly accurate and repeatable means of location determination data regardless of a direction of motion of said occlusion of light, such that as said occlusion of light moves across said optical sensor, an unbalanced output is created that only becomes balanced at an exact center of the said optical sensor.

13. The method of claim 11 wherein said object comprises an opaque object.

14. The method of claim 11 further comprising the steps of:

configuring said optical sensor to comprise a shape of a rectangle; and configuring said dual equal area active regions thereof to further comprise at least one upper region thereof configured in a shape of an inverted triangle and at least one lower region formed from a remainder of said rectangle, thereby resembling a shape of mirrored triangles having a common vertex and at least one hypotenuse thereof separated from said at least one upper region by a thin inactive region.

15. The method of claim 11 wherein said inverted triangle comprises an inverted equilateral triangle.

16. The method of claim 11 further comprising the step of:

generating an output from said optical sensor that is unbalanced as said occlusion moves across said optical sensor and which is balanced only at a precise center of said optical sensor.

17. The method of claim 12 further comprising the step of:

determining a direction and a magnitude of displacement from an output of said optical sensor.

18. The method of claim 11 further comprising the step of:

configuring said dual area active regions to comprise a first active region and a second active region, wherein a current differential output produced by said first and second active regions determines a distance from a center of said optical sensor and wherein a direction thereof can be determined by comparing said current differential output to a previous differential output.

19. The method of claim 12 further comprising the step of:

configuring said optical sensor such that as said object begins to occlude said optical sensor, a current in said upper region is higher than a current in said first and second lower regions until said object is directly centered over said optical sensor at which time said current in said upper region is approximately equal to said current in said first and second lower regions; and wherein as said object continues across said optical sensor, said current in said first and second lower regions is higher than said current in said upper region until said optical sensor eventually becomes entirely occluded at which time outputs thereof are approximately zero.

20. The method of claim 11 further comprising the step of generating from said optical sensor, a differential output whose characteristics provide highly accurately and repeatable location data regardless of a direction of motion of said occlusion of light.

* * * * *